(12) United States Patent
Jeong et al.

(10) Patent No.: US 7,796,230 B2
(45) Date of Patent: Sep. 14, 2010

(54) DISPLAY APPARATUS INCLUDING FIRST AND SECOND SIGNAL LINES CONNECTED TO DATA LINES ON RESPECTIVELY OPPOSITE SIDES OF A GATE INSULATING LAYER WITHIN THE SEAL LINE OF THE PERIPHERAL AREA AND ARRANGED FOR CURING THE SEAL LINE

(75) Inventors: Ki-Hun Jeong, Seoul (KR); Seok-Je Seong, Yongin-si (KR); Yong-Je Jeon, Suwon-si (KR); Jin-Young Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 379 days.

(21) Appl. No.: 11/933,281

(22) Filed: Oct. 31, 2007

(65) Prior Publication Data

US 2008/0143945 A1    Jun. 19, 2008

(30) Foreign Application Priority Data

Dec. 15, 2006    (KR) ...................... 10-2006-0128428

(51) Int. Cl.
*G02F 1/1339* (2006.01)

(52) U.S. Cl. .................... 349/153; 349/151; 349/190
(58) Field of Classification Search ......... 349/149–154, 349/190
See application file for complete search history.

(56) References Cited

U.S. PATENT DOCUMENTS 6,473,147 B1 *  10/2002  Nakahara et al. ............ 349/153
7,525,625 B2 *   4/2009  Aoki .......................... 349/139

FOREIGN PATENT DOCUMENTS

KR    1020030053179 A1    6/2003
KR    1020050113906 A1    12/2005
KR    1020060010117 A1    2/2006

* cited by examiner

*Primary Examiner*—John Heyman
(74) *Attorney, Agent, or Firm*—Cantor Colburn LLP

(57) ABSTRACT

A display apparatus includes a display substrate, an opposite substrate, a seal line, a driver chip, a gate insulating layer disposed on the display substrate, a first signal line disposed on a first side of the gate insulating layer, and a second signal line disposed on a second side of the gate insulating layer, wherein portions of the first signal line and the second signal line overlap each other along at least a portion of the seal line.

20 Claims, 10 Drawing Sheets

DISPLAY APPARATUS INCLUDING FIRST AND SECOND SIGNAL LINES CONNECTED TO DATA LINES ON RESPECTIVELY OPPOSITE SIDES OF A GATE INSULATING LAYER WITHIN THE SEAL LINE OF THE PERIPHERAL AREA AND ARRANGED FOR CURING THE SEAL LINE

This application claims priority to Korean Patent Application No. 2006-128428, filed on Dec. 15, 2006, and all the benefits accruing therefrom under 35 U.S.C.§119, the contents of which in its entirety are herein incorporated by reference.

BACKGROUND OF THE INVENTION

1. Field of the Invention

The present invention relates to a display apparatus. More particularly, the present invention relates to a display apparatus capable of preventing non-curing of a seal line.

2. Description of the Related Art

Generally, a flat panel display apparatus includes a display substrate, an opposite substrate and a driver chip. The display substrate includes a plurality of pixels, each pixel being connected to at least one of a plurality of data lines and gate lines. The display substrate may also contain a plurality of thin film transistors ("TFTs") for individually driving the pixels; for this reason the display substrate may also be referred to as the TFT substrate. The opposite substrate faces the display substrate, and a liquid crystal layer is disposed between the display substrate and the opposite substrate. The driver chip is electrically connected to the display substrate to drive the display apparatus.

In display apparatus designed for middle or small sized electronic devices, the driver chip is typically disposed at a lower side or an upper side of the display substrate. Accordingly, a length along the height of the display apparatus must be increased to accommodate the driver chip. In such a configuration the data lines are relatively easily connected to the driver chip and a seal line may be easily installed and cured to seal the display from external contaminants such as dirt, water, etc.

However, a new design for digital still cameras ("DSCs") has recently been developed wherein buttons for operating the DSC are disposed adjacent to a display screen of the DSC, so that the driver chip is disposed at a left side or a right side of the display substrate.

However, when the driver chip is disposed at the left side or the right side of the display substrate, data signal lines formed at the upper side or the lower side of the display substrate which electrically connect the data lines to the driver chip block ultra-violet ("UV") light used for curing the seal line and therefore the seal line may not be fully cured. This may in turn lead to contaminants entering the display apparatus, which in turn may cause the display apparatus to malfunction. A display device having the driving chip disposed to the left or right side of the display substrate while still maintaining a fully cured seal line is required.

BRIEF SUMMARY OF THE INVENTION

The present invention provides a display apparatus capable of preventing incomplete curing of a seal line.

In one exemplary embodiment of the present invention, a display apparatus includes; a display substrate including; a base substrate, a display area disposed on the base substrate and substantially surrounded by a peripheral area, a plurality of gate lines disposed on the base substrate which extend in a first direction, a gate insulating layer disposed on the gate lines, and a plurality of data lines disposed on the gate insulating layer which extend in a second direction substantially perpendicular to the first direction, an opposite substrate disposed substantially opposite the display substrate, a liquid crystal layer interposed between the display substrate and the opposite substrate, a seal line disposed between the display substrate and the opposite substrate in the peripheral area and which substantially surrounds the display area, a first signal line disposed on a first side of the gate insulating layer, and a second signal line disposed on a second side of the gate insulating layer which is disposed substantially opposite the first side of the gate insulating layer, wherein portions of the first signal line and the second signal line overlap each other along at least a portion of the seal line.

In one exemplary embodiment each of the second signal lines has a straight-line shape, and each of the first signal lines has a zigzag pattern which at least partially overlaps the second signal line.

In one exemplary embodiment each of the second signal lines may have a straight-line shape, and each of the first signal lines may have a wave-like shape which at least partially overlaps the second signal line.

In one exemplary embodiment the first signal lines may be disposed on the base substrate, the gate insulating layer may be disposed on the first signal lines and the second signal lines may be disposed on the gate insulating layer.

In one exemplary embodiment the peripheral area includes a first peripheral area disposed at one side of the display area, a second peripheral area disposed at a second side of the display area, a third peripheral area disposed at a third side of the display area and a fourth peripheral area disposed at a fourth side of the display area.

In one exemplary embodiment the first signal lines may include; first even-numbered signal lines disposed in the first peripheral area which is disposed substantially adjacent to a first end portion of the data lines, wherein the first even-numbered signal lines are connected to ($4m$-2)-th data lines of the plurality of data lines, and first odd-numbered signal lines disposed in the first peripheral area and the fourth peripheral area which is disposed substantially adjacent to a second end portion of the data lines which is substantially opposite the first end portion, and wherein the first odd-numbered signal lines are connected to ($4m$-3)-th data lines of the plurality of data lines, and wherein 'm' is a natural number.

In one exemplary embodiment the second signal lines may include; second even-numbered signal lines disposed in the first peripheral area and the third peripheral area, wherein the second even-numbered signal lines are connected to $4m$-th data lines of the plurality of data lines, and second odd-numbered signal lines are disposed in the first peripheral area and the fourth peripheral area, wherein the second odd-numbered signal lines are connected to ($4m$-1)-th data lines of the plurality of data lines.

In one exemplary embodiment the display substrate may further include a gate driver circuit section disposed in the second peripheral area substantially adjacent to a second end portion of the gate lines which is substantially opposite to the first end portion of the gate lines.

In one exemplary embodiment the display substrate may further include third signal lines which connect the driver chip and the gate driver circuit section through at least one of the third and fourth peripheral areas.

According to the display apparatus described above, incomplete curing of the seal-line may be prevented.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
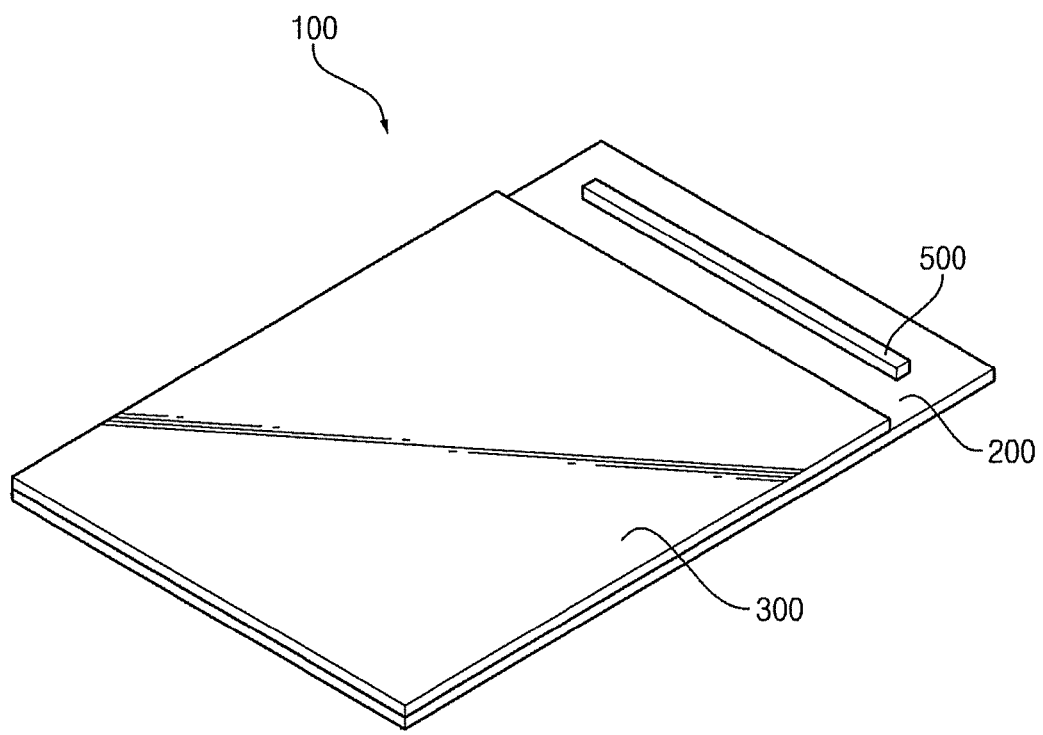
FIG. 1 is a top front perspective view illustrating an exemplary embodiment of a display apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
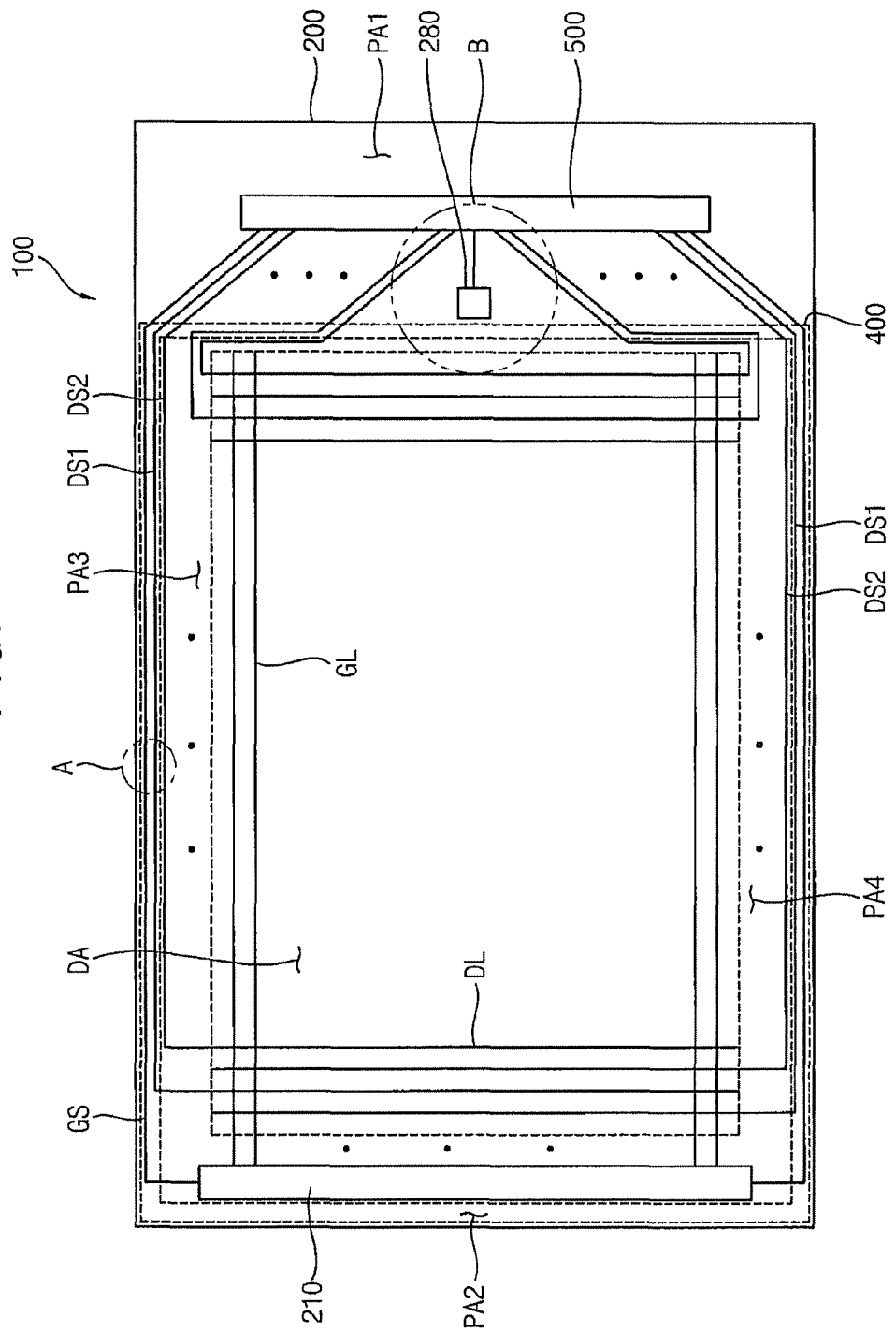
FIG. 2 is a top plan layout view of the exemplary embodiment of a display apparatus illustrated in FIG. 1.

FIG. 1 is a top front perspective view illustrating an exemplary embodiment of a display apparatus 100 according to the present invention, and FIG. 2 is a top plan layout view of the exemplary embodiment of a display apparatus 100 illustrated in FIG. 1.

Referring to FIGS. 1 and 2, the exemplary embodiment of a display apparatus 100 according to the present invention includes a display substrate 200, an opposite substrate 300, a seal line 400 and a driver chip 500. The opposite substrate 300 faces the display substrate 200 with a liquid crystal layer disposed therebetween. The seal line 400 connects the display substrate 200 and the opposite substrate 300. The driver chip 500 is mounted on the display substrate 200.

The display substrate 200 includes a display area DA including a plurality of pixels (not shown), a first peripheral area PA1, a second peripheral area PA2, a third peripheral area PA3 and a fourth peripheral area PA4. Images generated by the display apparatus 100 are formed in the display area DA. The first to fourth peripheral areas PA1, PA2, PA3 and PA4 are positioned surrounding the display area DA.

The display substrate 200 includes a plurality of gate lines GL and a plurality of data lines DL; each of the plurality of pixels being connected to at least one of the plurality of gate lines GL and one of the plurality of data lines DL. The gate lines GL and the data lines DL are insulated from each other by a gate insulting layer 220 (shown in more detail in FIGS. 4 and 5). The gate lines GL extend along a direction substantially perpendicular to a direction of extension of the data lines DL. In the present exemplary embodiment the gate lines GL extend along a horizontal direction, and the data lines DL extend along a vertical direction.

The display substrate 200 may further include a thin film transistor ("TFT") (not shown) formed in a region of a pixel where a gate line GL and a data line DL crosses each other. The TFT is electrically connected to the gate line GL and the data line DL. In one exemplary embodiment, a gate electrode (not shown) of the TFT is electrically connected to the gate line GL, a source electrode (not shown) of the TFT is electrically connected to the data line DL, and a drain electrode (not shown) of the TFT is electrically connected to a pixel electrode (not shown). When a gate signal is applied to the gate electrode of the TFT through the gate line GL, the TFT is turned on, and a data signal applied to the source electrode of the TFT through the data line DL is applied to the pixel electrode through the drain electrode of the TFT to drive a pixel of the exemplary embodiment of a display apparatus 100. Alternative exemplary embodiments include configurations wherein the pixels of the display apparatus 100 each include a plurality of TFTs.

The first peripheral area PA1 is adjacent to a first end of the gate lines GL, and the second peripheral area PA2 is adjacent to a second end of the gate lines GL, which is substantially opposite to the first end. The third peripheral area PA3 is adjacent to a first end of the data lines DL, and the fourth peripheral area PA4 is adjacent to a second end of the data lines DL, which is substantially opposite to the first end. In the present exemplary embodiment the first peripheral area PA1 is positioned to the right of the display area DA, the second peripheral area PA2 is positioned to the left of the display area DA and substantially opposite the first peripheral area PA1, the third peripheral area PA3 is positioned above the display area DA and adjacent to both the first and second peripheral areas PA1 and PA2, respectively, and the fourth peripheral area PA4 is positioned below the display area DA and substantially opposite to the third peripheral area PA3. Therefore, the display area DA is surrounded by the first to fourth peripheral areas PA1, PA2, PA3 and PA4.

The display substrate 200 may further include a gate driver circuit section 210 formed substantially in the second peripheral area PA2. The gate driver circuit section 210 includes a shift register having a plurality of transistors. The gate driver circuit section 210 may be formed through a process of forming the gate line GL, the data lines DL and the plurality of TFTs in the display area DA. In the present exemplary embodiment the gate driver circuit section 210 sequentially applies gate signals to the gate lines GL in response to a gate control signal applied from the driver chip 500. Alternative exemplary embodiments include configurations wherein the gate driver circuit section 210 applies gate signals to the gate lines GL non-sequentially.

The seal line 400 is formed at edge portions on the face of the opposite substrate 300 which is disposed opposite the display substrate 200 in order to seal the liquid crystal between the display substrate 200 and the opposite substrate 300.

In the present exemplary embodiment the seal line 400 includes photo-curable resin which may be cured by an external light such as ultra-violet ("UV") light. In one exemplary embodiment the seal line 400 is cured by applying the UV light along the length of the seal line 400 through the display substrate 200. Alternative exemplary embodiments include configurations wherein the seal line 400 is cured by applying UV light through the opposite substrate 300 or along the edges of one or both of the display substrate 200 or the opposite substrate 300.

In the present exemplary embodiment the driver chip 500 is mounted on the first peripheral area PA1 of the display substrate 200. When the driver chip 500 is mounted on the first peripheral area PA1 which corresponds to a right side of the display substrate 200 as seen from a top plan layout view, the size of the third and fourth peripheral areas PA3 and PA4 which respectively correspond to upper and lower sides of the display substrate 200 may be reduced. Alternative exemplary embodiments include configurations wherein the driver chip 500 may be mounted on the second peripheral area PA2, and the gate driver circuit section 210 may be formed in the first peripheral area PA1.

The driver chip 500 outputs various signals for driving the display apparatus 100 in response to various control signals applied thereto. In the present exemplary embodiment the driver chip 500 outputs a data signal applied to the data lines DL, a gate control signal applied to the gate driver circuit section 210, and a reference voltage applied to the opposite substrate 300. Alternative exemplary embodiments include configurations wherein one or both of the gate control signal and the reference voltage may be applied by a separate signal controller (not shown).

The display substrate 200 further includes first signal lines DS1 and second signal lines DS2 for transferring data signals from the driver chip 500 to the data lines DL.

Figure 3:
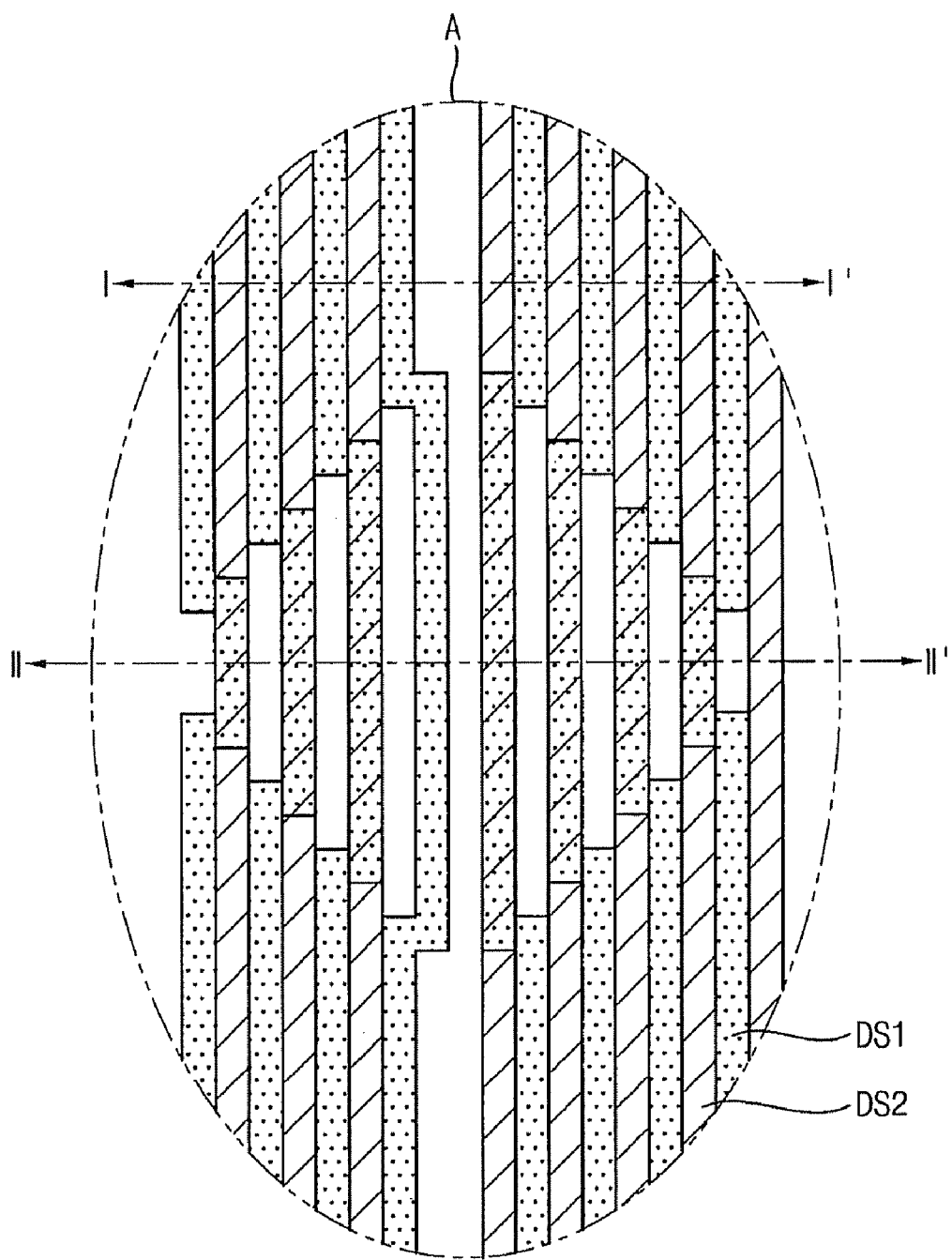
FIG. 3 is a magnified view illustrating a portion 'A' in FIG. 2.
Figure 4:
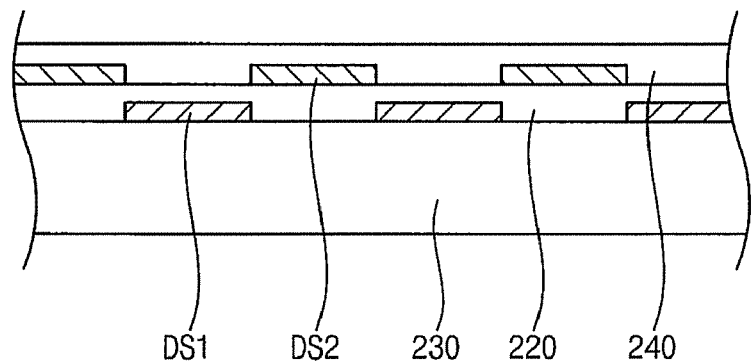
FIG. 4 is a cross-sectional view of the exemplary embodiment of a display device taken along line I-I' in FIG. 3.
Figure 5:
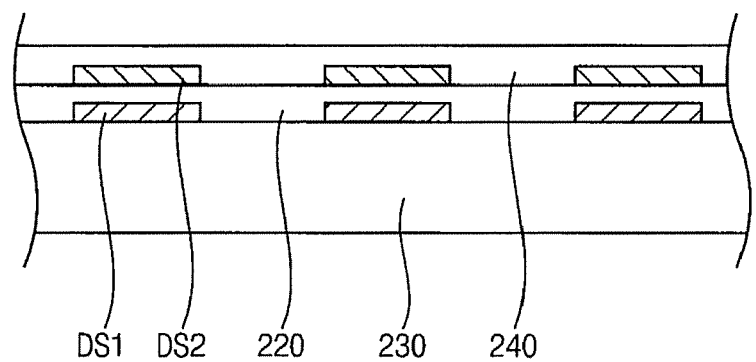
FIG. 5 is a cross-sectional view of the exemplary embodiment of a display device taken along line II-II' in FIG. 3.

FIG. 3 is a magnified view illustrating a portion 'A' in FIG. 2. FIG. 4 is a cross-sectional view of the exemplary embodiment of a display device 100 taken along line I-I' in FIG. 3. FIG. 5 is a cross-sectional view of the exemplary embodiment of a display device 100 taken along line II-II' in FIG. 3.

Referring to FIGS. 2 to 5, the first signal lines DS1 and the second signal lines DS2 are formed in the first peripheral area PA1, the third peripheral area PA3 and the fourth peripheral area PA4 to connect the data lines DL to the driver chip 500. The first and second signal lines DS1 and DS2 are connected to even-numbered data lines DL via the first peripheral area PA1 and the third peripheral area PA3, and the first and second signal lines DS1 and DS2 are connected to odd-numbered data lines DL via the first peripheral area PA1 and the fourth peripheral area PA4.

The first signal lines DS1 and the second signal lines DS2 are alternately arranged with the gate insulating layer 220 interposed therebetween. In detail, the first and second signal lines DS1 and DS2 are disposed at different layers with respect to the gate insulating layer 220. For example, the first signal lines DS1 and the gate lines GL are formed on a base substrate 230, the gate insulating layer 220 is formed on the base substrate 230, the first signal line DS1, and the gate lines GL, and the second signal lines DS2 and the data lines DL are formed on the gate insulating layer 220. A protecting layer 240 may be formed on the gate insulating layer 220, the second signal lines DS2, and the data lines DL to protect the second signal lines DS2 and the data lines DL from abrasions and other forms of damage. Alternative exemplary embodiments include configurations wherein the second signal lines DS2 may be formed on the base substrate 230 with the gate lines GL, and the first signal lines DS1 may be formed on the gate insulating layer 220 with the data lines DL.

As described above, when the first and second signal lines DS1 and DS2 are formed on different layers, a horizontal separation between the first and second signal lines DS1 and DS2 may be reduced which in turns allows a reduction in the widths of the third and fourth peripheral areas PA3 and PA4.

When the horizontal separation between the first and second signal lines DS1 and DS2 is reduced to the point where portions of the first and second signal lines DS1 and DS2 overlap with each other, the width of the third and fourth peripheral areas PA3 and PA4 may be even further reduced. However, when the first and second signal lines DS1 and DS2 overlap with each other passed a certain degree, a distortion of signal transferred through the first and second signal lines DS1 and DS2 may be induced due to a parasitic capacitance between the first and second signal lines DS1 and DS2. Therefore, the first and second signal lines DS1 and DS2 are formed with the dual concerns of reducing the width of the third and fourth peripheral areas PA3 and PA4 while transmitting signals without unnecessary signal distortion.

However, the horizontally offset first and second signal lines DS1 and DS2 may prevent the seal line 400 from being properly cured in the third and fourth peripheral areas PA3 and PA4 because the first and second signal lines DS1 and DS2 may block UV light advancing from below, as shown in FIG. 4. When the first and second signal lines DS1 and DS2 are seen from below, they form a solid line having the combined width of both signal lines.

Therefore, the first and second signal lines DS1 and DS2 may be made to overlap with each other such that the seal line 400 is exposed from underneath, thereby ensuring the curing of the seal line 400 by exposure to UV light from underneath.

Referring to FIGS. 3 and 5, the second signal lines DS2 are disposed in a substantially straight-line shape, and the first signal lines DS1 have a zigzag line shape such that portions of the first signal lines DS1 overlap with the second signal line DS2.

When the first signal lines DS1 are formed to have a zigzag pattern as described above, an area through which UV light passes increases by substantially the same area as an overlapping area of the first and second signal lines DS1 and DS2. Therefore, the seal line 400 may be more effectively cured. Alternative exemplary embodiments include configurations wherein the first signal lines DS1 may have a straight-line shape, and the second signal lines DS2 may have a zigzag pattern.

Generally, the gate lines GL and the data lines DL may include different metal, so that the gate lines GL and the data lines DL have different characteristics, including electrical resistance. In a typical display apparatus all of the data lines are made from the same materials. However, according to the current exemplary embodiment, the signal lines DS2, which include substantially the same metal as the data lines DL, have different resistivity from the signal lines DS1 which include substantially the same metal as the gate lines GL. This presents a problem in that the liquid crystal capacitors of pixels connected to the different signal lines may be distortedly charged. This distortion in the charging of the different liquid crystal capacitors would lower the quality of the resulting display if left unchecked.

The zigzagging pattern of the first signal lines DS1 solves this problem by increasing a length of the first signal lines DS1 when compared to the second signal lines DS2. This increase in length may be used to compensate for the differences in resistivity between the signal lines when the resistivity of the first signal lines DS1 is lower than the resistivity of the second signal lines DS2.

In the alternative exemplary embodiment wherein the resistivity of the first signal lines DS1 is higher than the resistivity of the second signal lines DS2, the first signal lines DS1 are formed to have a straight line shape, and the second signal lines DS2 are formed to have a zigzag pattern.

Figure 6:
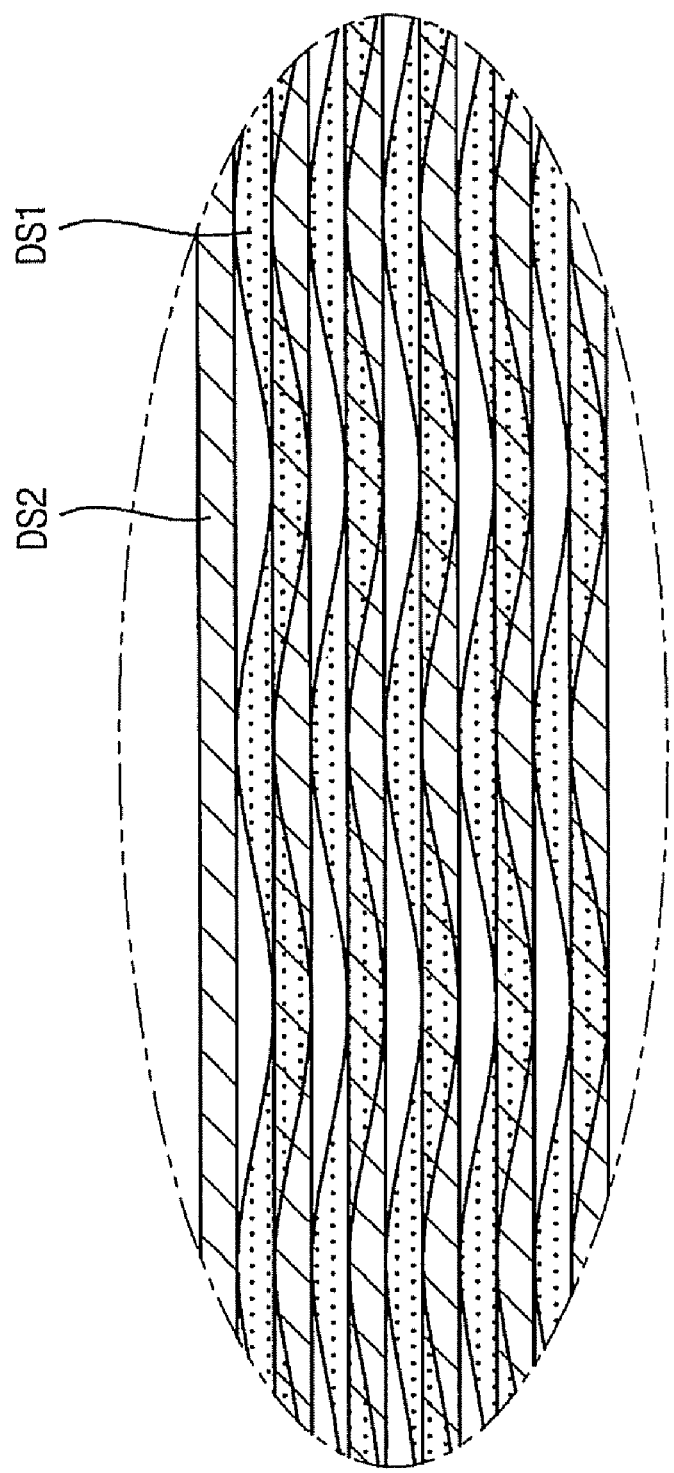
FIG. 6 is a magnified view illustrating a portion 'A' in FIG. 2 showing first and second signal lines according to another exemplary embodiment of the present invention.

FIG. 6 is an enlarged view illustrating a portion 'A' in FIG. 2 showing first and second signal lines according to another exemplary embodiment of the present invention.

Referring to FIG. 6, the second signal lines DS2 are formed to have the straight-line shape, and the first signal lines DS1 are formed to have a wave-like shape.

As described above, when the first signal lines DS1 are formed to have the wave-like shape, an area through which UV light passes increases by an amount substantially equal to the area of overlap between the first and second signal lines DS1 and DS2. Therefore, the seal line 400 may be more effectively cured. Additionally, length of the first signal lines DS1 becomes longer than a length of the second signal lines DS2 to compensate for the resistivity difference in the first and second signal lines DS1 and DS2 due to their different compositions. Again, alternative exemplary embodiments include configurations wherein the first signal lines DS1 may be formed to have the straight-line shape, and the second signal lines DS2 may be formed to have the wave shape. The determination of whether to increase the length of the first signal liens DS1 or the second signal lines DS2 depends upon which set of signal lines has lower resistivity; the signal lines with the lower resistivity have their lengths extended.

Figure 7:
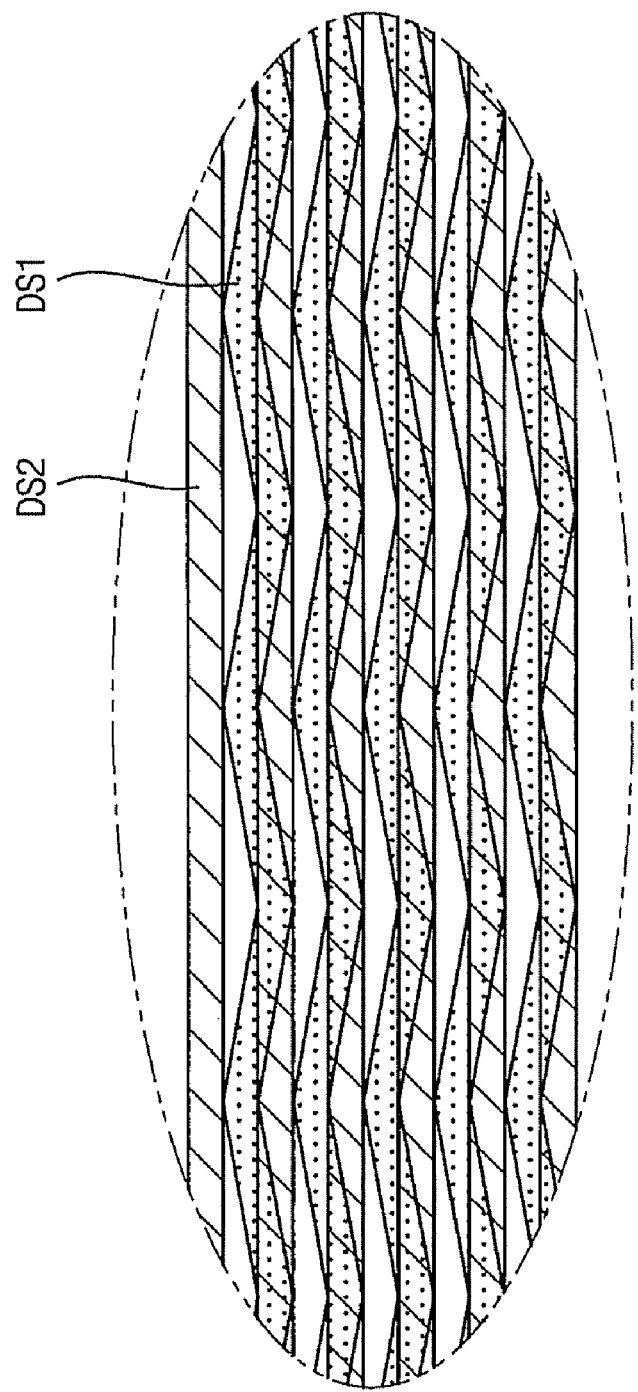
FIG. 7 is a magnified view illustrating a portion 'A' in FIG. 2 showing first and second signal lines according to another exemplary embodiment of the present invention.

FIG. 7 is an enlarged view illustrating a portion 'A' in FIG. 2 showing first and second signal lines according to another exemplary embodiment of the present invention.

Referring to FIG. 7, the second signal lines DS2 are formed to have the straight-line shape, and the first signal lines DS1 are formed to have a triangular wave-like shape.

As described above, when the first signal lines DS1 are formed to have the triangular wave-like shape, an area through which UV light passes increases by an amount substantially equal to the area of overlap between the first and second signal lines DS1 and DS2. Therefore, the seal line 400 may be more effectively cured. Additionally, a length of the first signal lines DS1 becomes longer than a length of the second signal lines DS2 to compensate the resistivity difference in the first and second signal lines DS1 and DS2 due to their different compositions. Again, alternative exemplary embodiments include configurations wherein the first signal lines DS1 may be formed to have the straight line shape, and the second signal lines DS2 may be formed to have the triangular wave-like shape. The determination of whether to increase the length of the first signal liens DS1 or the second signal lines DS2 depends upon which set of signal lines has lower resistivity; the signal lines with the lower resistivity have their lengths extended.

Figure 8:
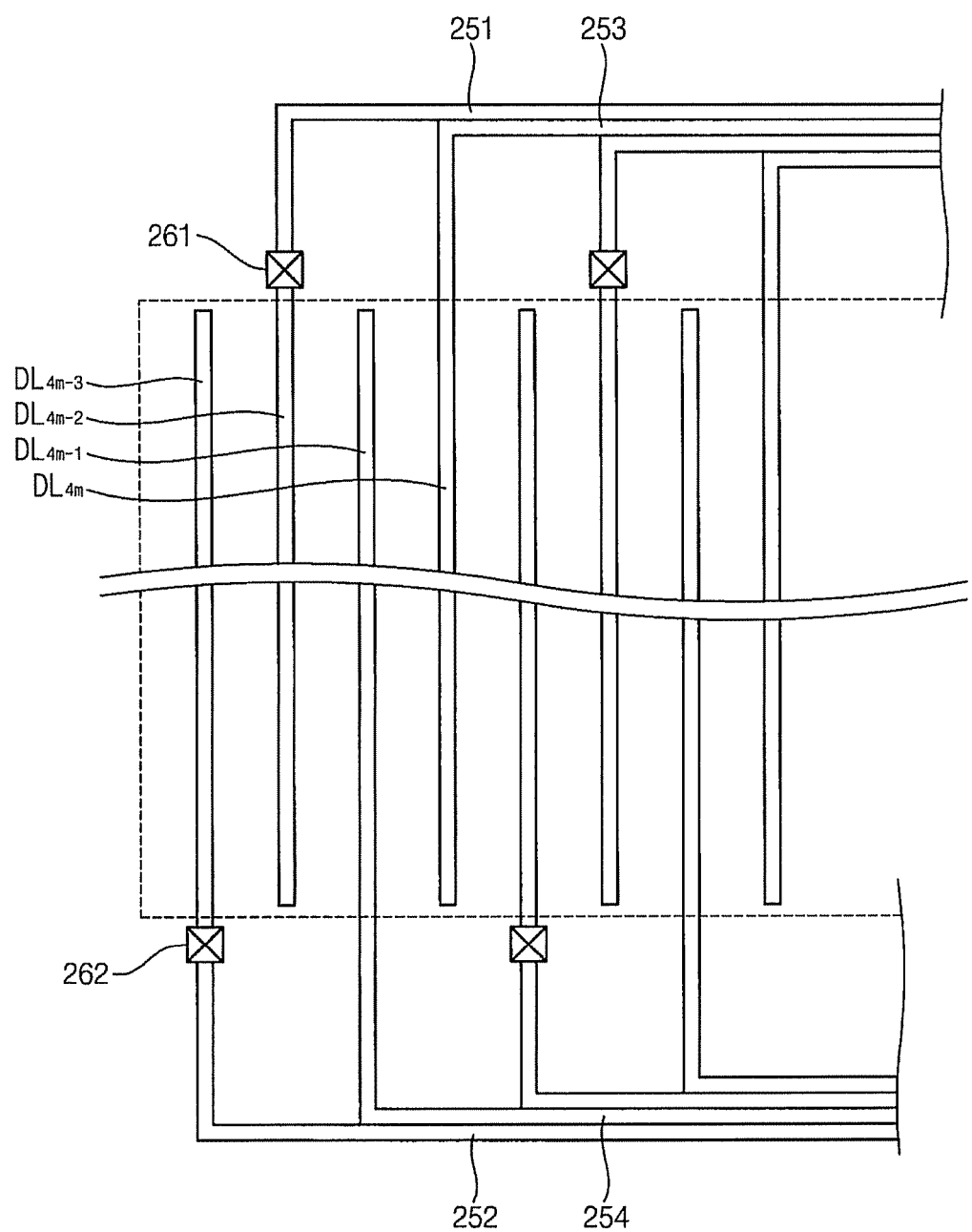
FIG. 8 is a top plan layout view illustrating a connection between data lines and first and second signal lines in the exemplary embodiment of a display apparatus shown in FIG. 2.

FIG. 8 is a top plan layout view illustrating a connection between data lines and first and second signal lines in the exemplary embodiment of a display apparatus 100 shown in FIG. 2.

Referring to FIGS. 2 and 8, the first signal lines DS1 include first even-numbered signal lines 251 and first odd-numbered signal lines 252.

The first even-numbered signal lines 251 are formed in the first peripheral area PA1 and the third peripheral area PA3. The first even-numbered signal lines 251 electrically connect the (4m-2)-th data lines $DL_{4m-2}$ to the driver chip 500, wherein 'm' is a natural number.

The first odd-numbered signal lines 252 are formed in the first peripheral area PA1 and the fourth peripheral area PA4. The first odd-numbered signal lines 252 electrically connect the (4m-3)-th data lines $DL_{4m-3}$ to the driver chip 500.

The second signal lines DS2 includes second even-numbered signal lines 253 and second odd-numbered signal lines 254.

The second even-numbered signal lines 253 are formed in the first peripheral area PA1 and the third peripheral area PA3. The second even-numbered signal lines 253 electrically connect the 4m-th data lines $DL_{4m}$ to the driver chip 500, wherein 'm' is a natural number.

The second odd-numbered signal lines 254 are formed in the first peripheral area PA1 and the fourth peripheral area PA4. The second odd-numbered signal lines 254 electrically connect the (4m-1)-th data lines $DL_{4m-1}$ to the driver chip 500.

To summarize, in the present exemplary embodiment the first even-numbered signal lines 251 and the second even-numbered signal lines 253 are electrically connected to even-numbered data lines DL via the first peripheral area PA1 and the third peripheral area PA3, and the first odd-numbered signal lines 252 and the second odd-numbered signal lines 254 are electrically connected to odd-numbered data lines DL via the first peripheral area PA1 and the fourth peripheral area PA4. Alternative exemplary embodiments include configurations wherein the even and odd numbered signal lines may be applied from the same peripheral areas.

The gate insulating layer 220 is formed on the base substrate 230 having the first even-numbered signal lines 251 and the first odd-numbered signal lines 252 formed thereon. to the gate insulating layer 220 covers the first even-numbered signal lines 251 and the first odd-numbered signal lines 252, and the data lines DL are subsequently formed on the gate insulating layer 220. In order to electrically connect the first even-numbered and odd-numbered signal lines 251 and 252 to the data lines DL, the display substrate 200 may include a first connecting part 261 connecting the first even-numbered signal lines 251 to the (4m-2)-th data lines $DL_{4m-2}$, and a second connecting part 262 connecting the first odd-numbered signal lines 252 to the (4m-3)-th data lines $DL_{4m-3}$. The relationships between the first and second connecting parts 261 and 262 and the data lines DL are described in more detail below with respect to FIG. 9.

Figure 9:
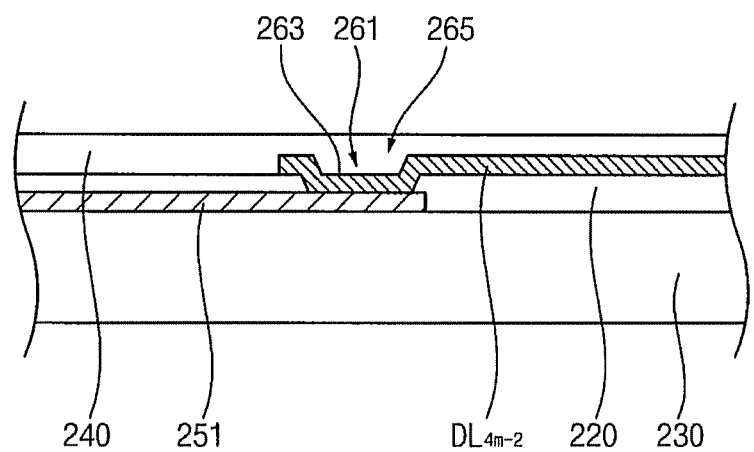
FIG. 9 is a cross-sectional view illustrating an exemplary embodiment of a first connecting part in FIG. 8 according to the present invention.

FIG. 9 is a cross-sectional view illustrating an exemplary embodiment of a first connecting part in FIG. 8 according to the present invention.

Referring to FIG. 9, the first even-numbered signal lines 251 is covered by the gate insulating layer 220, and the (4m-2)-th data lines $DL_{4m-2}$ are formed on the gate insulating layer 220. In the present exemplary embodiment the first connecting part 261 includes an extension 263 from the (4m-2)-th data line to contact the first even-numbered signal lines 251 through a contact hole 265. The (4m-2)-th data lines $DL_{4m-2}$ are electrically connected to the first even-numbered signal lines 251 through the contact hole 265 formed in the gate insulating layer 220. The (4m-3)-th data lines are similarly electrically connected to the first odd-numbered signal lines 252 via the second connecting part 262.

Figure 10:
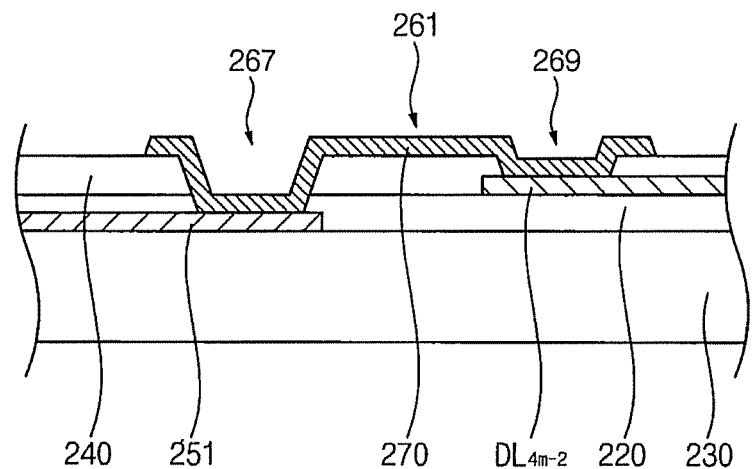
FIG. 10 is a cross-sectional view illustrating another exemplary embodiment of a first connecting part in FIG. 8 according to the present invention.

FIG. 10 is a cross-sectional view illustrating another exemplary embodiment of a first connecting part 261 in FIG. 8 according to the present invention.

Referring to FIG. 10, the first connecting part 261 includes a bridge electrode 270 connecting the first even-numbered signal lines 251 to the (4m-2)-th data lines $DL_{4m-2}$. A first end portion of the bridge electrode 270 is electrically connected to the first even-numbered signal lines 251 through a first contact hole 267 formed through the protecting layer 240 and the gate insulating layer 220, and a second end portion of the bridge electrode 270 is electrically connected to the (4m-2)-th data lines $DL_{4m-2}$ through a second contact hole 269 formed through the protecting layer 240. In one exemplary embodiment the bridge electrode 270 includes indium tin oxide ("ITO").

The second connecting part 262 has substantially same structure as the first connecting part 261. Thus, any further explanation about the second connecting part 262 will be omitted.

According to the exemplary embodiment of a display substrate 200 shown in FIGS. 2 and 8, the first even-numbered signal lines 251 and the second even-numbered signal lines 253 are formed in the third peripheral area PA3, and the first odd-numbered signal lines 252 and the second odd-numbered signal lines 254 are formed in the fourth peripheral area PA4. Alternative exemplary embodiments include configurations wherein the first even-numbered signal lines 251 and the second even-numbered signal lines 253 may be formed in the fourth peripheral area PA4, and the first odd-numbered signal lines 252 and the second odd-numbered signal lines 254 may be formed in the third peripheral area PA3.

Referring to FIGS. 2 and 8, the exemplary embodiment of a display substrate 200 may further include third signal lines GS for connecting the driver chip 500 mounted on the first peripheral area PA1 to the gate driver circuit section 210 formed in the second peripheral area PA2.

The third signal lines GS electrically connect the driver chip 500 to the gate driver circuit section 210 via at least one of the third and fourth peripheral areas PA3 and PA4.

The third signal lines GS disposed in the third peripheral area PA3 are formed outside of the first even numbered signal lines 251 and the second even-numbered signal lines 253 to prevent the third signal lines GS from being required to cross over or under the first or second even-numbered signal lines 251, 253. The third signal lines GS disposed in the fourth peripheral area PA4 are formed outside of the first odd-numbered signal lines 252 and the second odd-numbered signal lines 254 to prevent the third signal lines GS from being required to cross over or under the first or second odd-numbered signal lines 252, 254. In one exemplary embodiment the third signal lines GS are formed as nearly adjacent to the first and second even-numbered signal lines 251 and 253 or to the first and second odd—numbered signal lines 252 and 254 as much as possible while still preventing possible short circuiting and signal distortion.

A gate control signal output from the driver chip 500 is applied to the gate driver circuit section 210 through the third signal lines GS. In one exemplary embodiment the third signal lines GS may include an operation-start signal line transferring an operation-start signal which starts an operation of the shift register of the gate driver circuit section 210, first and second clock signal lines respectively transferring first and second clock signals having substantially opposite phases, and a gate-off signal line transferring a gate-off signal which turns off the TFT electrically connected to a gate line GL.

Figure 11:
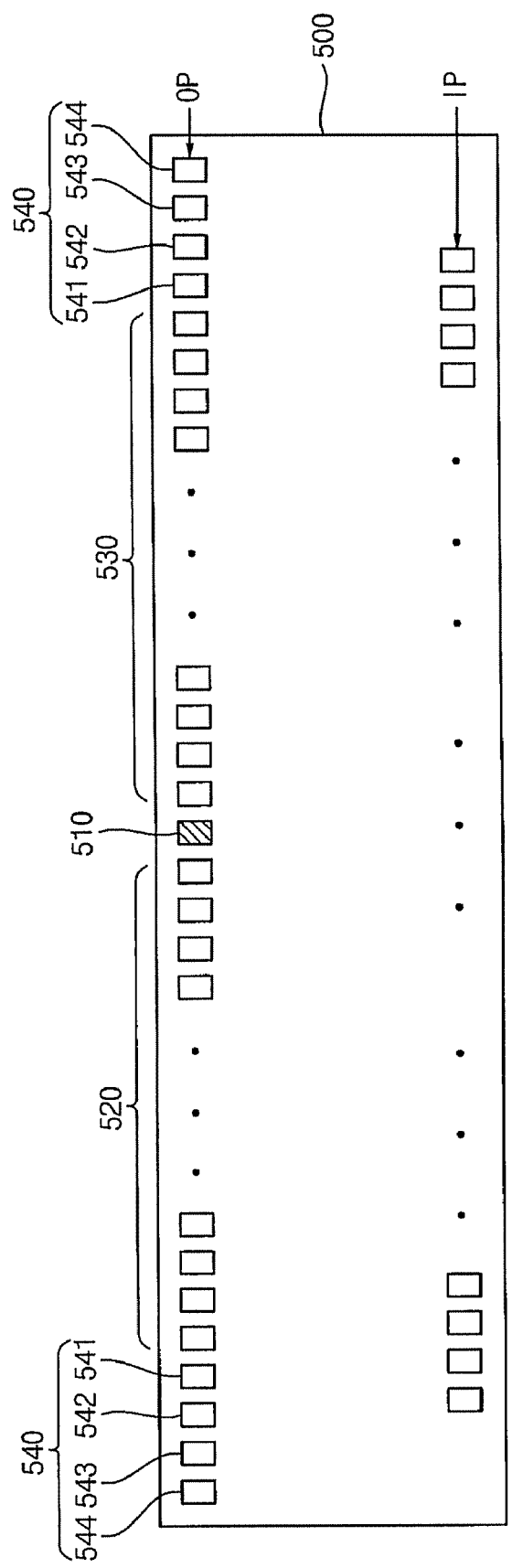
FIG. 11 is a plan layout view illustrating an exemplary embodiment of a pad structure of the driver chip shown in FIG. 2 as seen from below.

FIG. 11 is a plan layout view illustrating an exemplary embodiment of a pad structure of the driver chip 500 shown in FIG. 2 as seen from below.

Referring to FIGS. 2, 8 and 11, the driver chip 500 includes a plurality of input pads IP and a plurality of output pads OP. The input pads IP and the output pads OP are formed on a surface of the driver chip 500 which makes contact with the display substrate 200. The driver chip 500 outputs various signals for driving the display apparatus 100 through the output pads OP in response to various control signals received from outside through the input pads IP. In the current exemplary embodiment the driver chip 500 outputs a data signal applied to the data lines DL, a gate control signal applied to the gate driver circuit section 210, and a common voltage applied to the opposite substrate 300.

The output pads OP are arranged in a substantially straight line substantially perpendicular to the gate lines GL. Alternative exemplary embodiments include configurations wherein, the output pads OP may be arranged in a plurality of lines, each offset from each other and disposed substantially perpendicular to the gate lines GL. The alternative exemplary embodiment allows for a greater contact area between the output pads OP and the display substrate 200.

The output pads OP include a common electrode pad 510, first data signal pads 520, second data signal pads 530 and gate signal pads 540.

The common electrode pad 510 is disposed at a center portion of the driver chip 500 substantially in the middle of the output pads OP. A reference voltage Vcom is applied to a common electrode (not shown) of the opposite substrate 300 in FIG. 1 through the common electrode pad 510.

The first data signal pads 520 are arranged at a first side of the common electrode pad 510. In the present exemplary embodiment the first data signal pads 520 are arranged toward the third peripheral area PA3. The first data signal pads 520 are electrically connected to the first and second even-numbered signal lines 251 and 253. The data signals output from the first data signal pads 520 are applied to the even-numbered data lines DL through the first and second even-numbered signal lines 251 and 253.

The second data signal pads 530 are arranged at a second side of the common electrode pad 510, which is substantially opposite to the first side. In the present exemplary embodiment the second data signal pads 530 are arranged toward the fourth peripheral area PA4. The second data signal pads 530 are electrically connected to the first and second odd-numbered signal lines 252 and 254. The data signals output from the second data signal pads 530 are applied to the odd-numbered data lines DL through the first and second odd-numbered signal lines 252 and 254.

The gate signal pads 540 are arranged to the outside of the driver chip 500 with respect to the first and second data signal pads 520 and 530. The gate signal pads 540 are electrically connected to the third signal lines GS. The gate control signal output through the gate signal pads 540 is applied to the gate driver circuit section 210 through the third signal lines GS.

An exemplary embodiment of the gate signal pad 540 includes a first pad 541 outputting the operation-start signal, second and third pads 542 and 543 respectively outputting the first and second clock signals, and a fourth pad 544 outputting the gate-off signal. In one exemplary embodiment the fourth pad 544 which outputs the gate-off signal is disposed to the outside of the driver chip 500 with respect to the other pads of the gate signal pad 540, and the first pad 541 which outputs the operation-start signal is disposed to the inside of the driver chip 500 with respect to the other pads of the gate signal pad 540 to prevent signal distortion in the gate signal pads 540.

In one exemplary embodiment the display substrate 200 may have a short point 280 which is electrically connected to the opposite substrate 300.

Figure 12:
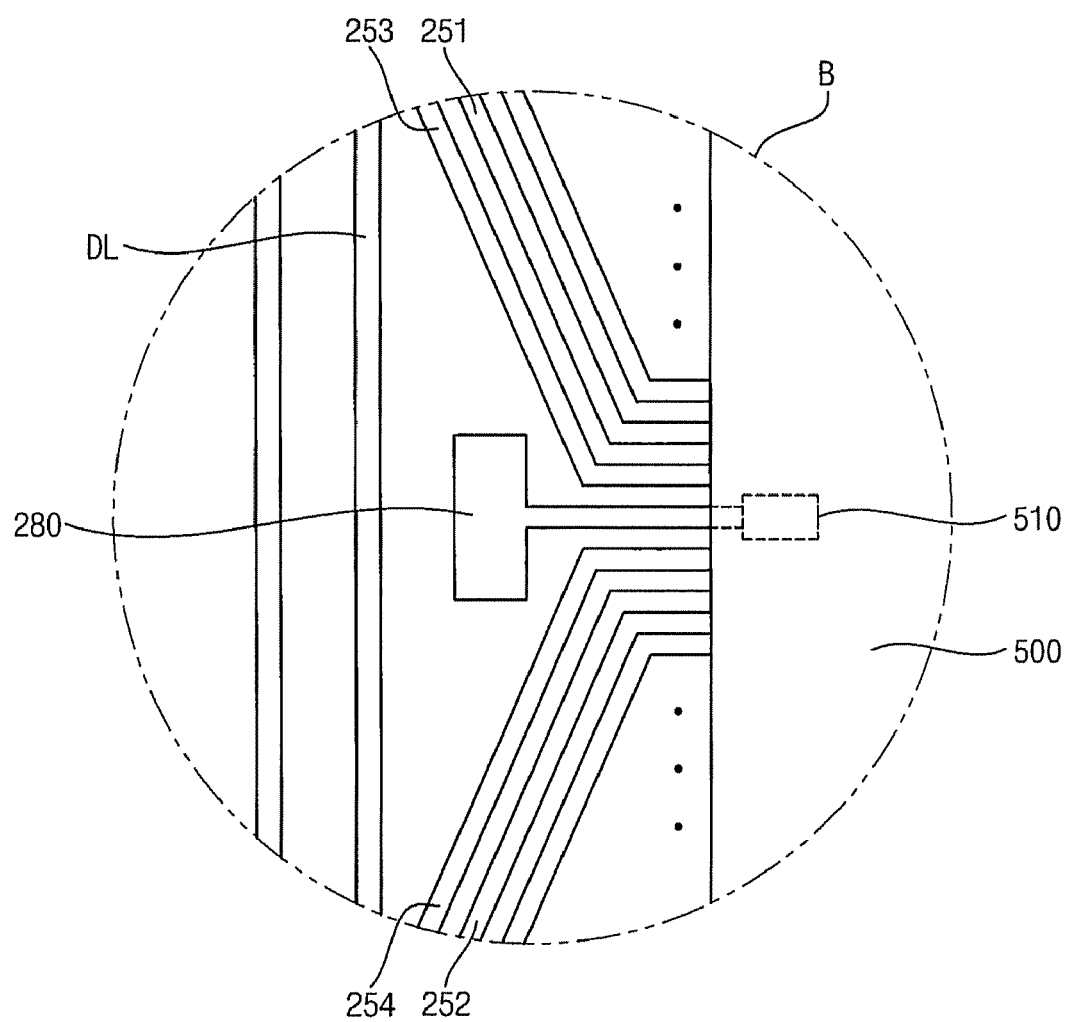
FIG. 12 is a magnified view illustrating a portion 'B' in FIG. 2.

FIG. 12 is an enlarged view illustrating portion 'B' of FIG. 2.

Referring to FIGS. 2, 8 and 12, the short point 280 is disposed between the first and second even-numbered signal lines 251 and 253, and the first and second odd-numbered signal lines 252 and 254 in the first peripheral area PA1.

In the present exemplary embodiment the first and second even-numbered signal lines 251 and 253 are angled toward the third peripheral area PA3, and the first and second odd-numbered signal lines 252 and 254 are angled toward the fourth peripheral area PA4. This angling of the first and second even and odd-numbered signal lines 251, 252, 253 and 254 generates space for forming the short point 280. When the short point 280 is formed in the space between the even-numbered signal lines 251 and 253, and the odd-numbered signal lines 252 and 254, an electrical path from the common electrode pad 510 of the driver chip 500 to the short point may be minimized, and space-using efficiency may be enhanced.

The reference voltage outputted from the common electrode pad 510 is applied to the common electrode (not shown) of the opposite substrate 300 through the short point 280.

Additionally, not shown in FIGS. 2, 8 and 12, when the first and second signal lines DS1 and DS2 electrically connected to the data lines DS adjacent to the driver chip 500 are bent to have a zigzag pattern, a wave-like shape, or any of the other exemplary shapes disclosed for enhancing the curing along the seal line 400, in the above-described space generated for the short point 280, a length difference between the first and second signal lines DS1 and DS2 electrically connected to the data lines DS relatively adjacent to the driver chip 500 and the first and second signal lines DS1 and DS2 electrically connected to the data lines DS relatively far from the driver chip 500, may be reduced. This reduction in length difference between signal lines may reduce a difference in resistance between those same signal lines.

According to an exemplary embodiment of a display apparatus of the present invention, the driver chip is disposed at a left side or a right side of the display area to reduce a width of an upper side and a lower side of the peripheral area adjacent to the display area.

Additionally, by dividing signal lines connecting the data lines to the driver chip, to be disposed in the lower side and upper side of the peripheral area, and by alternately disposing the signal lines above and below each other with respect to the gate insulating layer, the width of the upper side and the lower side of the peripheral area adjacent to the display area may be minimized.

Furthermore, by overlapping the signal lines disposed at different layers, the seal line may be effectively cured.

Having described the exemplary embodiments of the present invention and its advantages, it is noted that various changes, substitutions and alterations can be made herein without departing from the spirit and scope of the invention as defined by appended claims.

What is claimed is:
1. A display apparatus comprising:
   a display substrate including:
      a base substrate;
      a display area disposed on the base substrate and substantially surrounded by a peripheral area
      a plurality of gate lines disposed on the base substrate which extend in a first direction;
      a gate insulating layer disposed on the gate lines; and a plurality of data lines disposed on the gate insulating layer which extend in a second direction substantially perpendicular to the first direction;

an opposite substrate disposed substantially opposite the display substrate;

a liquid crystal layer interposed between the display substrate and the opposite substrate;

a seal line disposed between the display substrate and the opposite substrate in the peripheral area and which substantially surrounds the display area;

a first signal line connected to one of the plurality of data lines, and disposed in the peripheral area on a first side of the gate insulating layer; and a second signal line connected to another one of the plurality of data lines, and disposed in the peripheral area on a second side of the gate insulating layer which is disposed substantially opposite the first side of the gate insulating layer, wherein portions of the first signal line and the second signal line overlap each other thereby exposing at least a portion of the seal line.

2. The display apparatus of claim 1, wherein a first peripheral area is disposed substantially adjacent to a first end portion of the gate lines and a driver chip is mounted thereon.

3. The display apparatus of claim 2, wherein the first signal line comprises a plurality of first signal lines and the second signal line comprises a plurality of second signal lines.

4. The display apparatus of claim 3, wherein each of the second signal lines has a straight-line shape, and each of the first signal lines has a zigzag pattern which at least partially overlaps the second signal line.

5. The display apparatus of claim 3, wherein each of the second signal lines has a straight-line shape, and each of the first signal lines has a wave-like shape which at least partially overlaps the second signal line.

6. The display apparatus of claim 3, wherein each of the second signal lines has a straight-line shape, and each of the first signal lines has a triangular wave-like shape which at least partially overlaps the second signal line.

7. The display apparatus of claim 3, wherein the first signal lines are disposed on the base substrate, the gate insulating layer is disposed on the first signal lines and the second signal lines are disposed on the gate insulating layer.

8. The display apparatus of claim 7, wherein the peripheral area includes a first peripheral area disposed at one side of the display area, a second peripheral area disposed at a second side of the display area, a third peripheral area disposed at a third side of the display area and a fourth peripheral area disposed at a fourth side of the display area.

9. The display apparatus of claim 8, wherein the first signal lines comprise:

first even-numbered signal lines disposed in the first peripheral area and the third peripheral area which is disposed substantially adjacent to a first end portion of the data lines, wherein the first even-numbered signal lines are connected to $(4m-2)$-th data lines of the plurality of data lines; and first odd-numbered signal lines disposed in the first peripheral area and the fourth peripheral area which is disposed substantially adjacent to a second end portion of the data lines which is substantially opposite the first end portion, wherein the first odd-numbered signal lines are connected to $(4m-3)$-th data lines of the plurality of data lines, and wherein 'm' is a natural number.

10. The display apparatus of claim 9, wherein the second signal lines comprise:

second even-numbered signal lines disposed in the first peripheral area and the third peripheral area, wherein the second even-numbered signal lines are connected to $4m$-th data lines of the plurality of data lines; and second odd-numbered signal lines disposed in the first peripheral area and the fourth peripheral area, wherein the second odd-numbered signal lines are connected to $(4m-1)$-th data lines of the plurality of data lines.

11. The display apparatus of claim 10, wherein the display substrate comprises:

a first connecting part which electrically connects the first even-numbered signal lines to the $(4m-2)$-th data lines; and a second connecting part which electrically connects the first odd-numbered signal lines to the $(4m-3)$-th data lines.

12. The display apparatus of claim 10, wherein the display substrate further comprises a gate driver circuit section disposed in the second peripheral area substantially adjacent to a second end portion of the gate lines which is substantially opposite to the first end portion of the gate lines.

13. The display apparatus of claim 12, wherein the display substrate further comprises third signal lines which connect the driver chip and the gate driver circuit section through at least one of the third and fourth peripheral areas.

14. The display apparatus of claim 13, wherein the display substrate further comprises a short point disposed between the first and second even-numbered signal lines and the first and second odd-numbered signal lines in the first peripheral area, wherein the short point electrically connects the display substrate to the opposite substrate.

15. The display apparatus of claim 14, wherein the driver chip comprises a plurality of output pads arranged in a line substantially perpendicular to the gate lines.

16. The display apparatus of claim 15, wherein the plurality of output pads comprises:

a common electrode pad electrically connected to the short point and disposed at a central portion of the output pads;

a plurality of first data signal pads electrically connected to the first and second even-numbered signal lines, the first data signal pads being disposed closer to the third peripheral area with respect to the common electrode pad;

a plurality of second data signal pads electrically connected to the first and second odd-numbered signal lines, the second data signal pads being disposed closer to the fourth peripheral area with respect to the common electrode pad; and a plurality of gate signal pads electrically connected to the third signal lines, the gate signal pads being disposed to the outside of the first and second data signal pads.

17. The display apparatus of claim 14, wherein the driver chip comprises a plurality of output pads arranged in a zigzagging line wherein a direction of extension of the line is substantially perpendicular to the gate lines.

18. The display apparatus of claim 1, wherein the seal line comprises a photocurable material.

19. The display apparatus of claim 18 wherein the seal line is cured by UV light applied through the display substrate.

20. A method of manufacturing a display apparatus, the method comprising:

providing a display substrate including a base substrate and a display area substantially surrounded by a peripheral area;

disposing a plurality of gate lines which extend in a first direction on the base substrate;

disposing a gate insulating layer on the gate lines;

disposing a plurality of data lines which extend in a second direction substantially perpendicular to the first direction on the gate insulating layer;

disposing an opposite substrate substantially opposite the display substrate;

disposing a liquid crystal layer between the display substrate and the opposite substrate;

disposing a seal line between the display substrate and the opposite substrate on the peripheral area;

surrounding the display area with the seal line;

disposing a first signal line in the peripheral area , the first signal line is connected to one of the plurality of data lines on a first side of the gate insulating layer;

disposing a second signal line in the peripheral area, the second signal line is connected to another one of the plurality of data lines on a second and opposite side of the gate insulating layer; and overlapping portions of the first signal line and the second signal line along at least a portion of the seal line.

* * * * *